(12) United States Patent
Hull et al.

(10) Patent No.: US 7,885,901 B2
(45) Date of Patent: Feb. 8, 2011

(54) METHOD AND SYSTEM FOR SEEDING ONLINE SOCIAL NETWORK CONTACTS

(75) Inventors: Mark Everett Hull, San Jose, CA (US);
F. Randall Farmer, Palo Alto, CA (US);
Ellen Sue Perelman, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 0 days.

(21) Appl. No.: 10/863,926

(22) Filed: Jun. 8, 2004

(65) Prior Publication Data

US 2005/0171799 A1 Aug. 4, 2005

Related U.S. Application Data

(60) Provisional application No. 60/544,639, filed on Feb. 13, 2004, provisional application No. 60/540,505, filed on Jan. 29, 2004.

(51) Int. Cl.
*G06Q 10/00* (2006.01)
(52) U.S. Cl. ...................................................... 705/319
(58) Field of Classification Search ........................ None
See application file for complete search history.

(56) References Cited

U.S. PATENT DOCUMENTS

| | | | |
|---|---|---|---|
| 5,086,394 A | 2/1992 | Shapira | |
| 5,681,046 A | 10/1997 | Lawrence | |
| 5,835,087 A | 11/1998 | Herz et al. | |
| 5,950,193 A | 9/1999 | Kulkarni | |
| 5,950,200 A | 9/1999 | Sudai et al. | |
| 5,963,951 A | 10/1999 | Collins | |
| 5,996,006 A | 11/1999 | Speicher | |
| 6,029,141 A | 2/2000 | Bezos et al. | |
| 6,052,122 A | 4/2000 | Sutcliffe et al. | |
| 6,061,681 A | 5/2000 | Collins | |

(Continued)

FOREIGN PATENT DOCUMENTS

CA 2455342 6/2004

(Continued)

OTHER PUBLICATIONS

FAWs. Nov. 5, 2003, "About the ZeroDegrees Service" 25 pp., Available at http://www.zerodegrees.com/faq.htm.

(Continued)

*Primary Examiner*—Traci L Casler
*Assistant Examiner*—Gabrielle McCormick

(57) ABSTRACT

A method, apparatus, and system are directed towards seeding a user's contacts for their online social network. The invention is arranged to automatically recommend to the user a set of seed contacts that the user may employ to invite to join their social network. The set of seed contacts may be harvested from the user's existing portal activities, as well as other sources. In one embodiment, the invention analyzes portal activity, such as email exchanges with the user, and the like, to determine a frequency of contact with the user. Other sources may include but not be limited to emails, names within an address book of the user, names within an address book of another person, a buddy list, an instant messaging list, an activity, a mailing list, an online discussion group, a membership in a category, chat group, and the like.

20 Claims, 4 Drawing Sheets

U.S. PATENT DOCUMENTS

| | | | |
|---|---|---|---|
| 6,064,967 | A | 5/2000 | Speicher |
| 6,129,141 | A | 10/2000 | Yang |
| 6,175,831 | B1 | 1/2001 | Weinreich et al. |
| 6,243,375 | B1 | 6/2001 | Speicher |
| 6,249,282 | B1 | 6/2001 | Sutcliffe et al. |
| 6,269,369 | B1* | 7/2001 | Robertson ............... 707/10 |
| 6,272,467 | B1 | 8/2001 | Durand et al. |
| 6,282,515 | B1 | 8/2001 | Speicher |
| 6,285,984 | B1 | 9/2001 | Speicher |
| 6,296,369 | B1 | 10/2001 | Liao |
| 6,324,541 | B1* | 11/2001 | de l'Etraz et al. ....... 707/104.1 |
| 6,327,573 | B1 | 12/2001 | Walker et al. |
| 6,356,879 | B2 | 3/2002 | Aggarwal et al. |
| 6,433,795 | B1 | 8/2002 | MacNaughton et al. |
| 6,449,344 | B1 | 9/2002 | Goldfinger et al. |
| 6,466,917 | B1 | 10/2002 | Goyal et al. |
| 6,473,751 | B1 | 10/2002 | Nikolovska et al. |
| 6,502,077 | B1 | 12/2002 | Speicher |
| 6,606,657 | B1 | 8/2003 | Zilberstein et al. |
| 6,665,389 | B1 | 12/2003 | Haste, III |
| 6,697,786 | B2 | 2/2004 | Speicher |
| 6,714,931 | B1 | 3/2004 | Papierniak et al. |
| 6,735,568 | B1 | 5/2004 | Buckwalter et al. |
| 6,745,178 | B1 | 6/2004 | Emens et al. |
| 6,836,762 | B2 | 12/2004 | Speicher |
| 6,879,994 | B1 | 4/2005 | Matsliach et al. |
| 6,993,325 | B1 | 1/2006 | Waesterlid |
| 7,069,308 | B2 | 6/2006 | Abrams |
| 7,080,117 | B2 | 7/2006 | de Pinto et al. |
| 7,117,254 | B2 | 10/2006 | Lunt et al. |
| 7,167,910 | B2 | 1/2007 | Farnham et al. |
| 7,188,153 | B2 | 3/2007 | Lunt et al. |
| 7,200,638 | B2 | 4/2007 | Lake |
| 7,203,674 | B2 | 4/2007 | Cohen |
| 7,454,357 | B2 | 11/2008 | Buckwalter et al. |
| 7,512,653 | B2 | 3/2009 | Krishnasamy |
| 7,592,910 | B2 | 9/2009 | Tuck et al. |
| 7,613,706 | B2 | 11/2009 | Terrill et al. |
| 7,676,466 | B2 | 3/2010 | Terrill et al. |
| 7,788,260 | B2 | 8/2010 | Lunt et al. |
| 2001/0032245 | A1* | 10/2001 | Fodor ..................... 709/206 |
| 2002/0023132 | A1* | 2/2002 | Tornabene et al. ......... 709/205 |
| 2002/0023230 | A1 | 2/2002 | Bolnick et al. |
| 2002/0040310 | A1 | 4/2002 | Lieben et al. |
| 2002/0049616 | A1 | 4/2002 | Speicher |
| 2002/0059201 | A1 | 5/2002 | Work |
| 2002/0099806 | A1 | 7/2002 | Balsamo et al. |
| 2002/0103797 | A1 | 8/2002 | Goel et al. |
| 2002/0107242 | A1 | 8/2002 | Sabb et al. |
| 2002/0116458 | A1 | 8/2002 | Bricklin et al. |
| 2002/0116466 | A1 | 8/2002 | Trevithick et al. |
| 2002/0124053 | A1 | 9/2002 | Adams et al. |
| 2002/0178163 | A1 | 11/2002 | Mayer |
| 2003/0037114 | A1 | 2/2003 | Nishio et al. |
| 2003/0050977 | A1* | 3/2003 | Puthenkulam et al. ...... 709/204 |
| 2003/0074440 | A1 | 4/2003 | Grabarnik et al. |
| 2003/0093405 | A1 | 5/2003 | Mayer |
| 2003/0105827 | A1* | 6/2003 | Tan et al. ................... 709/206 |
| 2003/0135412 | A1 | 7/2003 | Speicher |
| 2003/0158855 | A1 | 8/2003 | Farnham et al. |
| 2003/0167324 | A1* | 9/2003 | Farnham et al. ............ 709/224 |
| 2003/0200217 | A1 | 10/2003 | Ackerman |
| 2003/0220980 | A1 | 11/2003 | Crane |
| 2003/0231207 | A1* | 12/2003 | Huang ..................... 345/752 |
| 2004/0010484 | A1 | 1/2004 | Foulger et al. |
| 2004/0044536 | A1* | 3/2004 | Fitzpatrick et al. ............. 705/1 |
| 2004/0048605 | A1 | 3/2004 | Schaefer et al. |
| 2004/0088315 | A1 | 5/2004 | Elder et al. |
| 2004/0088322 | A1 | 5/2004 | Elder et al. |
| 2004/0088325 | A1* | 5/2004 | Elder et al. ............ 707/104.1 |
| 2004/0103203 | A1 | 5/2004 | Nichols et al. |
| 2004/0107242 | A1 | 6/2004 | Vert et al. |
| 2004/0119760 | A1 | 6/2004 | Grossman et al. |
| 2004/0122681 | A1 | 6/2004 | Ruvolo et al. |
| 2004/0122803 | A1 | 6/2004 | Dom et al. |
| 2004/0122810 | A1 | 6/2004 | Mayer |
| 2004/0122855 | A1* | 6/2004 | Ruvolo et al. ............ 707/104.1 |
| 2004/0133440 | A1* | 7/2004 | Carolan et al. .................. 705/1 |
| 2004/0148275 | A1 | 7/2004 | Achlioptas |
| 2004/0153514 | A1 | 8/2004 | Crane |
| 2004/0167794 | A1 | 8/2004 | Shostack et al. |
| 2004/0177120 | A1 | 9/2004 | Kirsch |
| 2004/0199765 | A1 | 10/2004 | Kohane et al. |
| 2004/0210661 | A1 | 10/2004 | Thompson |
| 2004/0215648 | A1* | 10/2004 | Marshall et al. ............. 707/102 |
| 2004/0215793 | A1 | 10/2004 | Ryan et al. |
| 2004/0249811 | A1 | 12/2004 | Shostack et al. |
| 2004/0260781 | A1 | 12/2004 | Shostack et al. |
| 2004/0260792 | A1 | 12/2004 | Speicher |
| 2005/0015432 | A1 | 1/2005 | Cohen |
| 2005/0015455 | A1 | 1/2005 | Liu |
| 2005/0021750 | A1 | 1/2005 | Abrams |
| 2005/0076003 | A1 | 4/2005 | DuBose et al. |
| 2005/0076021 | A1 | 4/2005 | Wu et al. |
| 2005/0083906 | A1 | 4/2005 | Speicher |
| 2005/0125408 | A1 | 6/2005 | Somaroo et al. |
| 2005/0197846 | A1 | 9/2005 | Pezaris |
| 2005/0216300 | A1 | 9/2005 | Appelman et al. |
| 2005/0235062 | A1 | 10/2005 | Lunt et al. |
| 2006/0031121 | A1 | 2/2006 | Speicher |
| 2006/0059130 | A1 | 3/2006 | Weiss et al. |
| 2006/0059142 | A1 | 3/2006 | Zvinyatskovsky et al. |
| 2006/0059159 | A1 | 3/2006 | Truong et al. |
| 2006/0080121 | A1 | 4/2006 | Chiang |
| 2006/0155566 | A1 | 7/2006 | Berger |
| 2006/0218153 | A1 | 9/2006 | Voon et al. |
| 2006/0242128 | A1 | 10/2006 | Goel |
| 2007/0027921 | A1 | 2/2007 | Alvarado et al. |
| 2007/0031800 | A1 | 2/2007 | Solomon |
| 2007/0069901 | A1 | 3/2007 | Tuck et al. |
| 2007/0073802 | A1 | 3/2007 | Terrill et al. |
| 2008/0120277 | A1 | 5/2008 | Pettinati et al. |
| 2008/0133716 | A1 | 6/2008 | Rao et al. |

FOREIGN PATENT DOCUMENTS

JP          2004-272423          9/2004

OTHER PUBLICATIONS

BusinessWeek Online, "Diller's Latest Little Bet on the Net", Mar. 1, 2004, 2 pp., Available at http://www.businessweek.com:/print/technology/content/mar2004/tc20004031_2820_tc119.html.

Ethier, Jason "Current Research in Social Network Theory", Dec. 10, 2003, 10 pp., Available at http://upaya.soc.neu.edu/archive/students/Ethier-SocialNetworks.html.

Dragan, Richard V. PC Magazine. Jan. 20, 2004. Tribe.net(beta). 5pp. Available: http//:www.pcmag.com/article2/0,1759,1418688,00.asp.

Lorrie Faith Cranor et al., "Spam," Communications of the ACM, Aug. 1998, pp. 74-83, vol. 41, No. 8.

Matt Hines, "America Online proposes Love.com," Dec. 10, 2003<http://news.com.com/2100-1032-5118986.html>.

Matt Hines, "AOL serves up software for BREW", Dec. 9, 2003<http://news.com.com/2100-1038-5117686.html>.

Ken Jordan et al., "The Augmented Social Network: Building identity and trust into the next-generation Internet" First Monday Peer-Reviewed Journal on the Internet, (Jul. 2003) <http://www.firstmonday.dk/issues/issue8_8/jordar/>.

Written Opinion dated Oct. 3, 2006 for International Application PCT/US04/38696, filed Nov. 17, 2004.

International Search Report, mail date Oct. 3, 2006 of International Application No. PCT/US04/38696.

U.S. Appl. No. 11/314,201, Official Communication mailed Nov. 1, 2007.

International Search Report and Written Opinion of the International Searching Authority, mailed Oct. 3, 2006 for International Patent Application PCT/US04/38696 filed on Nov. 17, 2004.
"A Sneak Preview of the Christian Connection Matchmaker Who's On Page," Feb. 24, 1999, 3 pgs, archive.org website of www.christian.matchmaker.com, (accessed Jul. 28, 2007).
Welcome to My Yahoo!, 2 pgs., archive.org website of www.yahoo.com/r/il (accessed Feb. 15, 2007).
MatchMaker Help Pages—Frequently Asked Questions, 7 pgs., archive.org website of www.christian.matchmaker.com (accessed Feb. 15, 2007).
U.S. Appl. No. 10/832,172, Official Communication mailed May 16, 2007.
U.S. Appl. No. 10/832,172, Official Communication mailed Feb. 9, 2007.
U.S. Appl. No. 10/832,172, Official Communication mailed Aug. 23, 2006.
U.S. Appl. No. 10/946,636, Official Communication mailed Jul. 27, 2007.
U.S. Appl. No. 10/946,636, Official Communication mailed Feb. 21, 2007.
U.S. Appl. No. 10/946,636, Official Communication mailed Agu. 29, 2006.
U.S. Appl. No. 10/946,630, Official Communication mailed Jul. 27, 2007.
U.S Appl. No. 10/946,630, Official Communication mailed May 2, 2007.
U.S. Appl. No. 10/946,630; Official Communication mailed Feb. 6, 2007.
U.S. Appl. No. 10/946,630, Official Communication mailed Aug. 16, 2006.
U.S. Appl. No. 10/866,954, Official Communication mailed Aug. 8, 2007.
U.S. Appl. No. 10/866,954, Official Communication mailed Feb. 23, 2007.
U.S. Appl. No. 10/866,954, Official Communication mailed Jul. 26, 2006.
U.S. Appl. No. 10/866,954, Official Communication mailed Feb. 1, 2006.
U.S. Appl. No. 10/866,954, Official Communication mailed Mar. 16, 2005.
U.S. Appl. No. 11/314,201, Official Communication mailed May 17, 2007.
The Official America Online for Windows Tour Guide, Second Edition. Copyright 1994 Tom Lichty. pp. 239-256.
U.S. Appl. No. 10/946,630, Official Communication mailed Oct. 16, 2008.
U.S. Appl. No. 11/392,247, Official Communication mailed Nov. 4, 2008.
U.S. Patent and Trademark Office Communication dated Dec. 8, 2008 for corresponding U.S. Appl. No. 11/314,201, filed Dec. 20, 2005 (33 pages).
USPTO Office Communication mailed Feb. 9, 2009 in corresponding U.S. Appl. No. 10/946,636.
Office Communication for U.S. Appl. No. 10/946,636, mailed on Feb. 9, 2009.
Office Communication for U.S. Appl. No. 10/946,630, mailed on Mar. 10, 2009.
U.S. Appl. No. 11/392,247, Official Communication mail date Apr. 16, 2009.
U.S. Patent and Trademark Office Communication mailed Jul. 9. 2009 for Corresponding U.S. Appl. No. 11/314,206.
Office Communication for U.S. Appl. No. 10/946,630, mailed Oct. 26, 2009 (14 pages).
Office Communication for U.S. Appl. No. 11/392,247, mailed Nov. 23, 2009 (17 pages).
Office Communication for U.S. Appl. No. 10/866,954, mailed Sep. 2, 2009 (36 pages).
U.S. Patent and Trademark Office, Office Communication mailed Sep. 2, 2009 for U.S. Appl. No. 10/866,954, 36 pages.
Office Communication for U.S. Appl. No. 10/946,630, mailed Oct. 26, 2009 (14 pages).

Office Communication for U.S. Appl. No. 11/392,247, mailed Nov. 23, 2009 (17 pages).
U.S. Appl. No. 10/946,630, Official Communication mailed Feb. 5, 2010.
"Welcome to the Christian Connection Matchmaker", archive.org website of www.christian.matchmaker.com, Feb. 21, 1999.
"The Purpose Principles and Process", archive.org website of www.christian.matchmaker.com, Feb. 24, 1999.
"A Sneak Preview of the Christian Connection Matchmaker Search Page", archive.org website of www.christian.matchmaker.com, May 8, 1999.
"A Sneak Preview of the Christian Connection Matchmaker Match Page", archive.org website of www.christian.matchmaker.com, Feb. 23, 1999.
"Yahoo! Groups—What is a Group?", archive.org website of www.yahoo.com, Nov. 3, 2002.
"Yahoo! Groups-Getting Started, Groups Account, Groups Features", archive.org website of www.yahoo.com, Oct. 31, 2002.
"Yahoo! Groups—What is the spam policy of Yahoo! Groups? How do I avoid spam?", archive.org website of www.yahoo.com, Oct. 24, 2002.
Merrick, Amy; "The Best Way to . . . Find a Date—Ok, so true love isn't guaranteed; But there are ways to better the odds", Wall Street Journal, New York, NY, p. R 16, ProQuest ID 64669169, Nov. 27, 2000.
Member site Selection Page for Matchmaker.com, web.archive.org webpage of Feb. 19, 1999, web.archive.org/web/19990219183131/matchmaker.com/newtry.shtml.
Welcome to the Christian Connection Matchmaker, web archive.org webpage of Feb. 22, 1999, web.archive.org/web/19990222170152/http://www.Christian.email.net/index/html.
Matchmaker.com Disclaimer, web.archive.org webpage of Apr. 20, 2000, web.archive.org/web/20000420114350/www.Christian.matchmaker.com/rules.
International Preliminary Report on Patentability dated Dec. 14, 2006 issued for corresponding International Patent Application No. PCT/US2004/038703.
"System Names and Numbers," archive.org website of www.christian.matchmaker.com, Apr. 24, 1999 (Feb. 15, 2007).
"Matchmaker User Tools Pages," archive.org website of www.christian.matchmaker.com, Apr. 24, 1999, pp. 1-2 (Feb. 15, 2007).
"Matchmaker Help—Block," archive.org website of www.christian.matchmaker.com, Sep. 10, 1999, p. 1 (Feb. 15, 2007).
"Matchmaker Help—Main Page," archive.org website of www.christian.matchmaker.com, Oct. 4, 1999, p. 1-3 (Feb. 15, 2007.
friendster.com as cited by examiner in U.S. Appl. No. 11/561,254 on Oct. 8, 2010.
orkut.com as cited by examiner in U.S. Appl. No. 11/561,254 on Oct. 8, 2010.
eharmony.com as cited by examiner in U.S. Appl. No. 11/561,254 on Oct. 8, 2010.
facebook.com as cited by examiner in U.S. Appl. No. 11/561,254 on Oct. 8, 2010.
match.com as cited by examiner in U.S. Appl. No. 11/561,254 on Oct. 8, 2010.
hotornot.com as cited by examiner in U.S. Appl. No. 11/561,254 on Oct. 8, 2010.
myspace.com as cited by examiner in U.S. Appl. No. 11/561,254 on Oct. 8, 2010.
cybersuitors.com as cited by examiner in U.S. Appl. No. 11/561,254 on Oct. 8, 2010.
"A Sneak Preview of The Christian Connection Matchmaker User Profile Page" http://web.archive.org/web/19990223210921/www.christian.matchmaker.com/ppbrowse, Feb. 23, 1999.
Tiwana, Amrit et al., "A Social Exchange Architecture for Distributed Web Communities," 2001, Journal of Knowledge Management, 5, 3, ABI/INFORM Global, p. 242-248.
Moore, Kimberly, "The Law and Economics of Survivor," 2000, George Mason University School of Law, pp. 1-39.
" System Names and Numbers" archive.org website of www.christian.matchmaker.com, Apr. 24, 19999.
" Matchmaker User Tools Page" archive.org website of www.christian.matchmaker.com, Apr. 24, 1999.

"Matchmaker Help - Block" archive.org website of www.christian.matchmaker.com, Sep. 10, 1999.

"Matchmaker Help - Main Page" archive.org website of www.christian.matchmaker.com, Oct. 4, 1999.

"Welcome to Christian Connection Matchmaker" http://web.archive.org/web/19990221092342/www.christian.matchmaker.com/main, Feb. 21, 1999.

"The Purpose Principles and Process" http://web.archive.org/web/19990224045035/www.christian.matchmaker.com/process, Feb. 24, 1999.

"A Sneak Preview of the Christian Connection Matchmaker Search Page" http://web.archive.org/web/19990508232314/www.christian.matchmaker.com/ppsearch, May 8, 1999.

"A Sneak Preview of the Christian Connection Matchmaker Match Page" archive.org website of www.christian.matchmaker.com, Feb. 23, 1999.

"Yahoo! Groups - What is a Group?" http://web.archive.org/web/20021103223155/www.yahoo.com/r/ub, Nov. 3, 2002.

"Yahoo! Groups - Getting Started, Groups Account, Groups Features" http://web.archive.org/web/20021017061719/http://help.yahoo.com/help/groups, Oct. 17, 2002.

"Yahoo! Groups - What is the spam policy of Yahoo! Groups? How do I avoid spam?" http://web.archive.org/web/20021024130230/help.yahoo.com/help/us/groups/groups-05.html, Oct. 24, 2002.

Merrick, A., "The Best Way to . . . Find a Date—OK, so true love isn't guaranteed; But there are ways to better the odds" Wall Street Journal, New York, NY, pp. 1-5, ProQuest ID 64669169, Nov. 27, 2000.

"Member Site Selection Page for Matchmaker.com" http://web.archive.org/web/19990219183131/matchmaker.com/newtry.shtml, Feb. 19, 1999.

"Welcome to the Christian Connection Matchmaker" http://web.archive.org/web/19990222170152/http://www.christian.email.net/index.html, Feb. 22, 1999.

"Matchmaker Disclaimer" http://web.archive.org/web/20000420114350/www.christian.matchmaker.com/rules, Apr. 20, 2000.

Hallett, Vickey "Shopping: Bagging the Best Deals Online," U.S. News & World Report Nov. 12, 2006, 2 pages http://www.usnews.com/usnews/biztech/articles/061112/20sites.shopping.htm, accessed May 17, 2007.

Tedeschi, Bob, "Filling a gap online, shoe sales shine," International Herald Tribune, Oct. 23, 2006, 2 pages http://iht.com/articles/2006/10/23/business/ecom.php, accessed May 17, 2007.

MetricStream, Enterprise Quality and Compliance Management Solutions, "Zaplet Technology within MetricStream" www.metricstream.com/products/zap_tec_ms.htm, Sep. 16, 2005.

Gmail, "About Gmail" http://mail.google.com/mail/help/about.html, accessed Sep. 16, 2005.

True U, "Using True" www.true.com/magazine/true_coach_summertips_part9.htm, accessed Sep. 16, 2005.

AmericanSingles.com, "Learn More about AmericanSingles.com" visited Sep. 16, 2005, www.americansingles.com/defaultasp?p=13010&CategoryID=62.

Office Communication for U.S. Appl. No. 10/946,630 mailed Jan. 29, 2008.

Office Communication for U.S. Appl. No. 10/946,630 mailed Jun. 12, 2009.

Office Communication for U.S. Appl. No. 10/946,636 mailed Dec. 13, 2007.

Office Communication for U.S. Appl. No. 11/392,247 mailed Mar. 3, 2008.

International Preliminary Report on Patentability for International Patent Application No. PCT/US2004/038703 mailed Dec. 4, 2006.

International Search Report for International Patent Application No. PCT/US2004/038704 mailed Jul. 7, 2005.

International Search Report for International Patent Application No. PCT/US2005/031142 mailed Oct. 24, 2006.

International Search Report and Written Opinion for International Patent Application No. PCT/US2007/070525 mailed Oct. 29, 2007.

International Preliminary Report on Patentability for International Patent No. PCT/US2005/032417 mailed Feb. 14, 2006.

* cited by examiner

METHOD AND SYSTEM FOR SEEDING ONLINE SOCIAL NETWORK CONTACTS

CROSS REFERENCE TO RELATED APPLICATIONS

This application claims the benefit of U.S. Provisional Application, titled "System and Method for Social Networking," Ser. No. 60/544,639 filed on Feb. 13, 2004, and U.S. Provisional Application, titled "System and Method for Social Networking," Ser. No. 60/540,505 filed on Jan. 29, 2004, the benefit of the earlier filing date of which is hereby claimed under 35 U.S.C. §119(e) and further incorporated by reference.

FIELD OF THE INVENTION

The present invention relates generally to computing software, and more particularly, but not exclusively to a method and system for seeding contacts for a user's online social network.

BACKGROUND OF THE INVENTION

Social networking is a concept that an individual's personal network of friends, family colleagues, coworkers, and the subsequent connections within those networks, can be utilized to find more relevant connections for dating, job networking, service referrals, activity partners, and the like.

A social network typically comprises a person's set of direct and indirect personal relationships. Direct personal relationships usually include relationships with family members, friends, colleagues, coworkers, and other people with which the person has had some form of direct contact, such as contact in person, by telephone, by email, by instant message, by letter, and the like. These direct personal relationships are sometimes referred to as first-degree relationships. First-degree relationships can have varying degrees of closeness, trust, and other characteristics. These relationships can also be unidirectional or bidirectional. A unidirectional relationship typically means that a first person is willing and able to interact with a second person, but the second person may not be willing or able to interact with the first person. Conversely, a bidirectional relationship typically means that both people are willing and able to interact with each other.

Indirect personal relationships typically include relationships through first-degree relationships to people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as a second-degree relationship.

The above personal relationships, and others, can be utilized to find and develop relevant connections for a variety of objectives. Finding and developing relevant connections can be accelerated with online services. Such online social networking can be used to mine personal and/or interest relationships in a way that is often more difficult and/or time-consuming to do offline. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
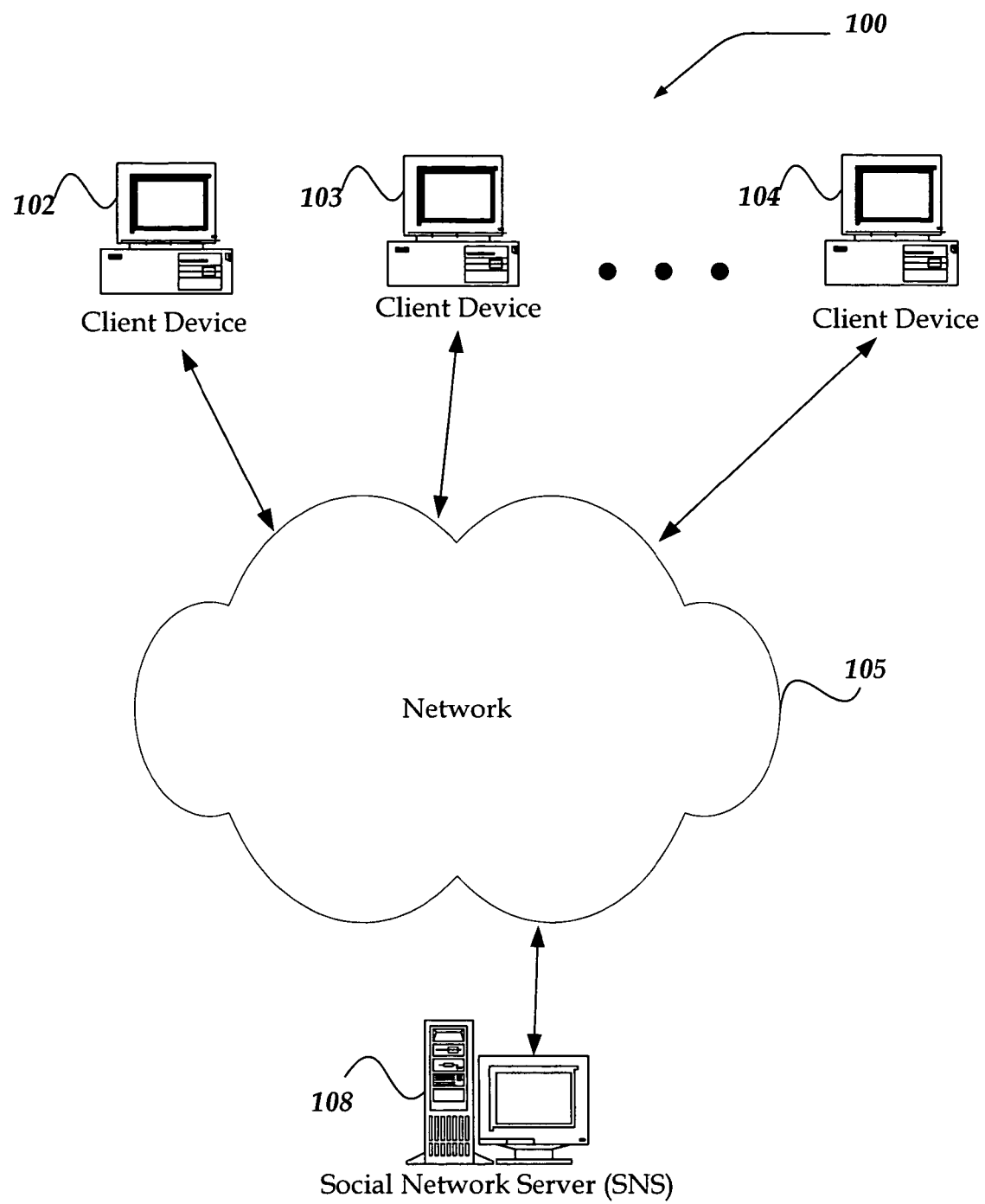
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards providing a system, apparatus, and method of seeding contacts for a user's online social network. The invention provides a user with an easy way to build and mine personal networks. As such, in one embodiment, the invention automatically recommends to the user, perhaps new to social networking, a set of seed contacts that the user may wish to invite to join their social network. The set of seed contacts that are recommended may be harvested from the user's existing portal activities. In one embodiment, this may include analyzing portal activity, such as a number of email exchanges with the user, and the like, to determine a frequency of contact with the user. This may further include other connections, associations, and the like, including, but not limited to emails, names within an address book of the user, names within an address book of another person within the portal, a buddy list, an instant messaging buddy list, a mailing list, an online discussion group, an activity, chat group, and the like. By automatically recommending seed contacts to the user's online social network, the user is freed from having to create their own contacts from scratch.

Accordingly, as employed herein, the term "user" can include an online portal subscriber and/or an online social network user. The term social network can include a group of people with which a user has direct and/or indirect relationships, as well as a service for communicating information to and/or from any of the people with which a user has direct and/or indirect relationships.

An indirect relationship can also be through a shared interest, without any degree of personal relationship between intermediate contacts. For example, a set of complete strangers can comprise a social network based on a common interest in a topic or an activity, such as fishing. At first, each person may only have a relationship with the activity of fishing, without any relationship through other people in the set. However, the activity of fishing can act as a node that binds the set of people into a social network, just as if the node were a mutual friend of each person in the set. The members of the set can build people relationships by somehow expressing to each other the common interest in the activity. Once a person is aware of another person with the same interest, the people can choose to interact. Thus, the term social network includes a group of people associated by a common interest and/or a service for communicating information to and/or from any of the people with which a user has an interest relationship.

To build a trust base quickly, information about another member gathered from other venues can be provided to a new member of the online social network. For example, information about another member's behavior in an online portal can be made accessible to the new member of the online social network. Information about the new members's behavior may also be employed to seed their own contact list. In addition to behavior information, such portal information can comprise user-defined information, portal assessment information, and the like. User-defined information can include contact lists, preferences, survey responses, and other information provided by the user. User behavior information can include frequency of visiting Web sites, types of online purchases, types of online communication used most often, duration of participating in online activities, and other information that can be detected about a user's online actions. Portal assessment information can include compliments about a user, complaints about a user, reputation assessments from peer users, comparison between user-defined information and user behavior information, spam detection about a user, and other information determined by others about a user. Many other types of information can be stored and/or determined by an online portal regarding a user. The present invention enables a member of an online social network to access and/or share portal information, thereby enabling the member to learn more about each other, to quickly identify compatible members, to create a basis for rapid seeding and viral-style growth of their social network, thus, freeing the member from having to create a contact list from scratch, and generally to enhance experiences relating to the online social network.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 100 includes client devices 102-104, a network 105, and a social network server (SNS) 108. Network 105 is in communication with and enables communication between each of client devices 102-104, and SNS 108.

Client devices 102-104 may include virtually any computing device capable of receiving and sending a message over a network, such as network 105, to and from another computing device, such as SNS 108, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie-talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 may include a browser application that is configured to receive and to send web pages, and the like. The browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Client devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

Client devices 102-104 may be further configured to enable a user to access and/or manage a portal profile, an SNS profile, SNS category information, SNS activity participation, and the like, which may in turn be saved at a remote location, such as SNS 108, and the like. As such, client devices 102-104 may further include a client application that is configured to manage various actions on behalf of the client device. For example, the client application may enable a user to interact with the browser application, email application, and the like, to establish a user's online portal, to customize the user's interaction with an online portal, to manage the user's online portal, to customize how another social network user might view a persona, profile, or the like. For example, the user may employ the client application, in part, to establish and/or modify an online portal profile, to manage a contact list, to interact with online portal services, such as financial information tools, to make online purchase, to store and communicate with contacts, and the like. The user may also employ the client application, in part, to establish and/or modify a portal profile and/or an SNS profile, to establish categories of SNS relationships to provide one customized view of SNS profile information for family members, another customized view for poker members, yet another view for fishing buddies, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links. Furthermore, remote computers and other related electronic devices could be remotely connected to either LANs or WANs via a modem and temporary telephone link. In essence, network 105 includes any communication method by which information may travel between client devices 102-104 and SNS 108.

The media used to transmit information in communication links as described above illustrates one type of computer-readable media, namely wired and/or wireless communication media. Generally, computer-readable media includes any media that can be accessed by a computing device. Computer-readable media may include computer storage media, communication media, or any combination thereof. Additionally, communication media typically embodies computer-readable instructions, data structures, program modules, or other data in a modulated data signal such as a carrier wave or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of SNS 108 is described in more detail below in conjunction with FIG. 2. Briefly, however, SNS 108 may include any computing device capable of connecting to network 105 to communicate information between client devices 102-104. Devices that may operate as SNS 108 include personal computers desktop computers, multiprocessor systems, microprocessor-based or programmable consumer electronics, network PCs, servers, and the like. SNS 108 and client devices 102-104 can be arranged in a client-server relationship relative to each other. Client devices 102-104 can also be combined with SNS 108 in virtually any other computing architecture, including, but not limited to a peer-to-peer architecture, and the like, without departing from the scope of the present invention.

SNS 108 may be configured to send and/or make accessible, portal information associated with a user, and configured to enable the user to customize at least a portion of the portal information. SNS 108 also may be configured to use the portal information and user input information as online social network information, and to enable the user to customize at least a portion of the social network information. SNS 108 may further be configured to employ the social network information, as well as other information, to automatically seed a contact list for a member. Such social network information may include, but is not limited to, user profile information, contact information, relationship category information, an activity, user-defined information, membership information associated with a relationship category, and the like.

SNS 108 may further employ the social network information to enable the user to customize a view associated with a social network relationship. By providing customized views, the user may put forth different online profiles, public personas, and the like, by sharing varying quantities of personal information with another social network user. Criteria employed to enable customization of the views may include, but is not limited to, degrees of separation, category of relationship (such as family, friend, colleague, and the like), as well as any assessment of closeness, trust, and the like, based on information about the relationship between the user and the prospective viewer, and the like. SNS 108 may also enable another social network user to view the customized view based on the received criteria. SNS 108 may employ a web service, email service, and the like, to make the customized view available to the other social network user, such as a user of one of client devices 102-104.

Illustrative Server Environment

Figure 2:
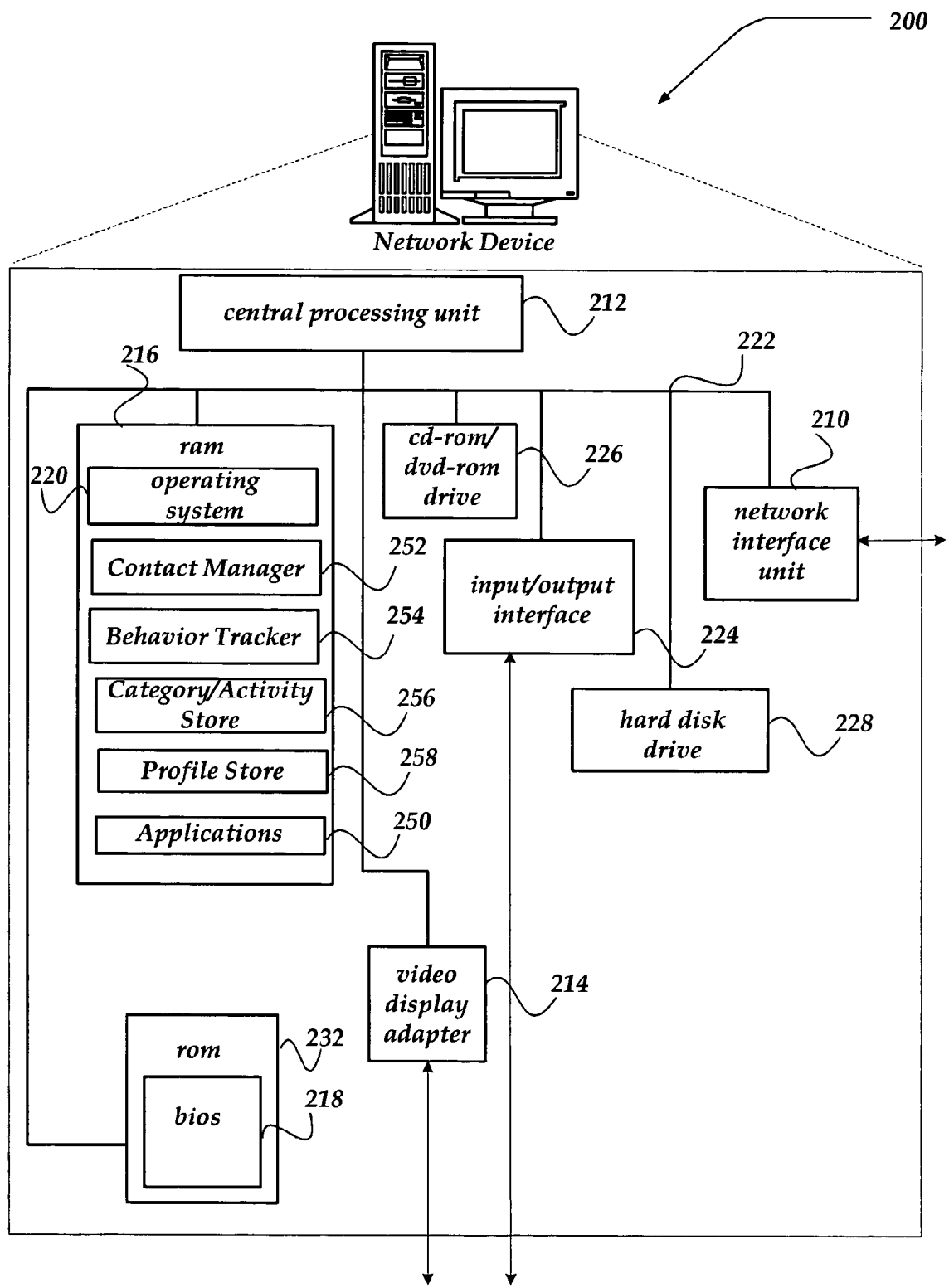
FIG. 2 shows one embodiment of a network device that may be included in a system implementing the invention.

FIG. 2 shows a functional block diagram of an exemplary network device 200, according to one embodiment of the invention. For example, network device 200 can comprise SNS 108. Client devices 102-104 can be similarly configured. Network device 200 may include many more components than those shown. The components shown, however, are sufficient to disclose an illustrative embodiment for practicing the invention.

Network device 200 includes a processing unit 212, a video display adapter 214, and a mass memory, all in communication with each other via a bus 222. The mass memory generally includes RAM 216, ROM 232, and one or more permanent mass storage devices, such as an optical drive 226, a hard disk drive 228, a tape drive, and/or a floppy disk drive. The mass memory stores an operating system 220 for controlling the operation of network device 200. Any general-purpose operating system may be employed. A basic input/output system ("BIOS") 218 is also provided for controlling low-level operation of network device 200. As illustrated in FIG. 2, network device 200 can communicate with the Internet, or some other communications network, such as network 105 of FIG. 1, via a network interface unit 210, which may be constructed for use with any of variety of communication protocols including, but not limited to, transmission control protocol/Internet protocol (TCP/IP), and the like. Network interface unit 210 is sometimes known as a transceiver, transceiving device, network interface card (NIC), and the like. Network device 200 also includes input/output interface 224 for communicating with external devices, such as a mouse, keyboard, scanner, or other input devices not shown in FIG. 2.

Network device 200 may include a simple mail transfer protocol (SMTP) handler application for transmitting and receiving email. Network device 200 may also include a hypertext transfer protocol (HTTP) handler application for receiving and handing HTTP requests, and an HTTP secure sockets (HTTPS) handler application for handling secure connections. The HTTPS handler application may initiate communication with an external application in a secure fashion.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may further include applications such as a contact manager 252, behavior tracker 254, category/activity store 256, and profile store 258.

Category/activity store 256 may include a database, text, folder, file, and the like, that is configured to maintain and store information that identifies a relationship category, an activity, and the like. While category/activity store 256 may store identification information, profile store 258, described below, may store profile and criteria information for each portal subscriber and/or social network user. Profile store 258 can comprise multiple distributed data stores, such as a portal subscriber profile data store, a social network profile data store, and the like.

A category may represent a classification of users and/or corresponding relationships within a user's social network, such as family members, friends, co-workers, poker buddies, fishing buddies, and the like. Social network users can establish their own categories and profile information based on corresponding portal profile data and/or manually entered data. Information relating to a category may be accessible to those identified as members of the category by the creating social network user. However, the invention is not so limited, and global categories may be established that provide profile information about a social network user to virtually any other social network user. Each category may include a set of user-definable social network user information. When the category is user-definable, the set of social network user information (profile information) may also be user-definable. For example, the user may determine that social network user information associated with hobbies may be included in a category for sports, while it may be excluded from a category associated with religion, and the like.

An activity may include virtually any way, manner, and the like, in which a social network user may select to employ their social network connections. For example, activities may include, but are not limited to, dating, job seeking, reconnecting with military comrades, communicating with fellow alumni, seeking help & advice, and the like. It may be desired, although not required, that an activity be globally configured and managed by an online social network service, and made available to all users of the online social network service. Additionally, at least a minimum set of profile information associated with the activity may be globally established. For example, if the activity includes dating, the minimum set of profile information, may include, but is not limited to age, sexual preference, information associated with one's physical appearance, and the like. If the activity includes job search, employment search, and the like, the minimum set of profile information may include, but is not limited to, job history, salary desired, job qualifications, experience, and the like. However, an activity may further include an optional set of profile information, such as achievements, hobbies, recommendations, and the like. Such profile information can be provided from the portal to the online social network service or otherwise accessed by the online social network service.

Profile store 258 may include a database, text, folder, file, and the like, that is configured to maintain and store information associated with a portal subscriber and/or a corresponding social network user. For example, a portal subscriber's portal profile may include, but is not limited to such information as name, alias, nickname, age, email address, address book, online behaviors, and the like. In one embodiment, a collection of such information may be provided to an online social network service to comprise a basic social network profile for the social network user. Additional information may also be included in profile store 258 that includes category profile information, activity profile information and the like. Such additional information may include, but is not limited to, a photograph, a hobby, a job history, a school history, career information, dating information, military information, sports information, religious information, sexual orientation, politics, interests, favorite sites, self description, frequency of accessing a Web site, duration of participating in an online activity, number of purchases made from an online vendor, and the like. In one embodiment, at least some information includes a Universal Resource Locator (URL). Virtually any information associated with the portal subscriber and associated social network user may be included within profile store 258.

Moreover, profile store 258 may store and maintain criteria associated with how profile information may be viewed by another social network user. For example, profile store 258 may include criteria indicating that only a member of a particular category may view a particular photograph, a subset of profile information, and the like. While information may be selected at a field by field level of granularity, the present invention however, is not so limited. For example, the present invention enables the social network user to establish criteria that is based on a relationship between the prospective viewer and the user. The relationship criteria may then be employed to map various collections, groupings, sets, and the like, of portal profile information, to a corresponding social network profile. As such, the social network user, for example, may establish criteria such that any other social network user that is within some predetermined degrees of separation may view a predetermined set of social network profile information that is mapped from corresponding portal profile information.

Behavior tracker 254 is configured to detect and store information regarding a portal subscriber's online actions and can determine profile characteristics about the portal subscriber. For example, behavior tracker 254 can detect that a portal subscriber navigated to one or more news Web sites at approximately the same time each day for a current month, spent approximately twenty hours playing an online game during each week of the current month, made purchases from multiple overseas vendors of software, participated in a hacker chat room, performed searches for movie times, sent an email messages to a thousand sequential addresses in one day, and/or performed other actions. From these actions, behavior tracker 254 can determine characteristics about the portal subscriber, assess the accuracy of information provided by the portal subscriber to the online portal, gather feedback about the portal subscriber submitted by other portal subscribers, and perform other tracking and evaluation operations. For instance, behavior tracker 254 can give a low weighting to portal profile information submitted by the portal subscriber, which indicated that the portal subscriber was a practicing dentist. Behavior tracker 254 might also includes a flag, indicator, and the like, indicating that the portal subscriber might be engaged in spamming. Moreover, another flag might be included that indicates that another member of the online network that may have interacted with portal subscriber was practicing potentially undesirable activity. Other aspects of behavior tracker 254 are described in more detail below in conjunction with FIG. 3.

Contact manager 252 may be configured to employ information from a variety of sources, including behavior tracker 252, profile store 258, and the like, to enable a user to manage their social networking contacts. For example, in one embodiment, when the user joins a social network, contact manager 252 may automatically recommend contacts for which the user may wish to invite to join their social network, their categories, and the like. The recommended set of seed contacts may also be harvested from the user's existing portal activities. In one embodiment, contact manager 252 may analyze portal activity, such as a number of email exchanges with the user, and the like, to determine a frequency of contact with the user. This may further include other connections, associations, and the like, including, but not limited to emails, names within an address book of the user, names within an address book of another person within the portal, a buddy list, an instant messaging buddy list, an activity, chat group, and the like. In another embodiment, a master list of contact information may also be employed as a source for seed contacts. Such master list of contact information, for example, may include a variety of sources for contacts, including, but not limited to, an address book repository, multiple source social network data stores, and the like. Contact manager 252 may then provide the set of seed contacts to the user for review, acceptance, modification, and the like. Contact manager 252, for example, may employ a process substantially similar to process 400 described below in conjunction with FIG. 4.

Although illustrated in FIG. 2 as distinct components in network device 200, contact manager 252, behavior tracker 254, category/activity store 256, and profile store 258 may be arranged, combined, and the like, in any of a variety of ways, without departing from the scope of the present invention. For example, category/activity store 256 may be arranged as separate components, such as an activity store and a category store, or the like. Moreover, contact manager 252, behavior tracker 254, category/activity store 256, and profile store 258 may reside in one or more separate computing devices, substantially similar to network device 200.

Portal Process

Figure 3:
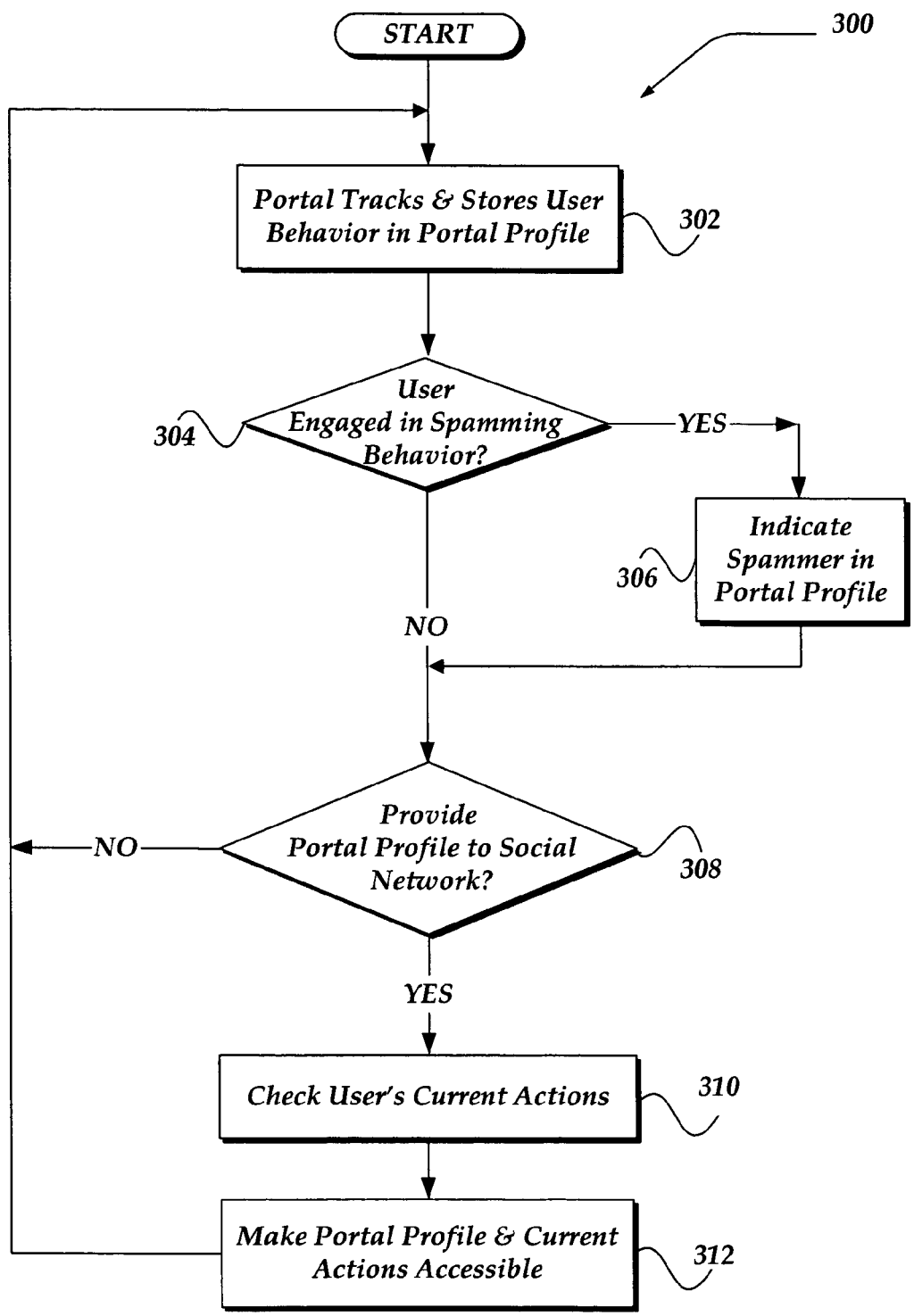
FIG. 3 illustrates a logical flow diagram generally showing one embodiment of a process for making portal information available.

The operation of certain aspects of the present invention will now be described with respect to FIGS. 3-4. Briefly, FIG. 3 illustrates a logical flow diagram generally showing one embodiment of a process for an online portal to make portal subscriber information available for use in seeding a contact list. Process 300 of FIG. 3 may be implemented, for example, within SNS 108 of FIG. 1.

The process is typically entered, after a start block, when a portal subscriber registers with an online portal. Initially, a portal subscriber's portal profile may only include a user ID. However, the portal subscriber can enter other information such a name, age, preferences, interests, contact list, and the like. The entered information may be stored in the portal profile and is usually accessible to the portal subscriber. Typically, with the portal subscriber's consent, the online portal tracks and stores the portal subscriber's behavior in the portal profile, at block 302. Some, or all, of the tracked information can be accessible to, or hidden from, the portal subscriber. In addition, the portal can add information to the portal profile indicating characteristics, possible interests, and/or other information determined about the portal subscriber. For example, the portal can determine that the portal subscriber uses the portal mostly to read news, mostly to find a job, mostly to write blogs, and/or other usage habits. Additionally, if the subscriber selects to join an activity, a group, online club, and the like, such information may also be collected and stored in the portal profile. If the subscriber receives, sends messages to another subscriber, such information may also be tracked. In fact, virtually any activity, behavior, and the like, may be tracked and stored in the subscriber's portal profile.

Moving to decision block 304, the portal can use some of the above information to determine whether the portal subscriber has engaged in spamming behavior, and/or other behavior that is deemed undesirable by portal operators, by other portal subscribers, by law, and the like. If it is determined that the portal subscriber has engaged in undesirable behavior, such as spamming, the portal can indicate this fact in the portal subscriber's portal profile, at block 306. Other actions may also be taken, as desired, including, but not limited to, warning the portal subscriber, sanctioning the portal subscriber, terminating the portal subscriber's access to the portal, and the like.

Additionally, in one embodiment, if the portal subscriber is in communication with another member that may have engaged in undesirable behavior, this fact may also be included within the information within the portal subscriber's portal profile, the other member's portal profile, and the like, at block 306.

Whether or not the portal subscriber has engaged in undesirable behavior, the process moves to decision block 308, where a determination is made whether the information already obtained through the portal is be provided to the social network. If the portal information is not being provided, portal process 300 returns to block 302 to continue tracking the portal subscriber's behavior. Otherwise, the portal process proceeds to block 310, where a check of the portal subscriber's current actions is performed. Current actions can include listening to music streamed to the portal subscriber's computer, viewing a particular Web site, and the like. Moving to block 312, the current actions and the portal profile can then be made accessible to the social network, for use in a variety of activities, including, but not limited to seeding a contact list for the portal subscriber, another portal subscriber, and the like. Portal processing may then return to block 302 to continue tracking the portal subscriber's behavior.

Seeding Online Social Network Contacts

Figure 4:
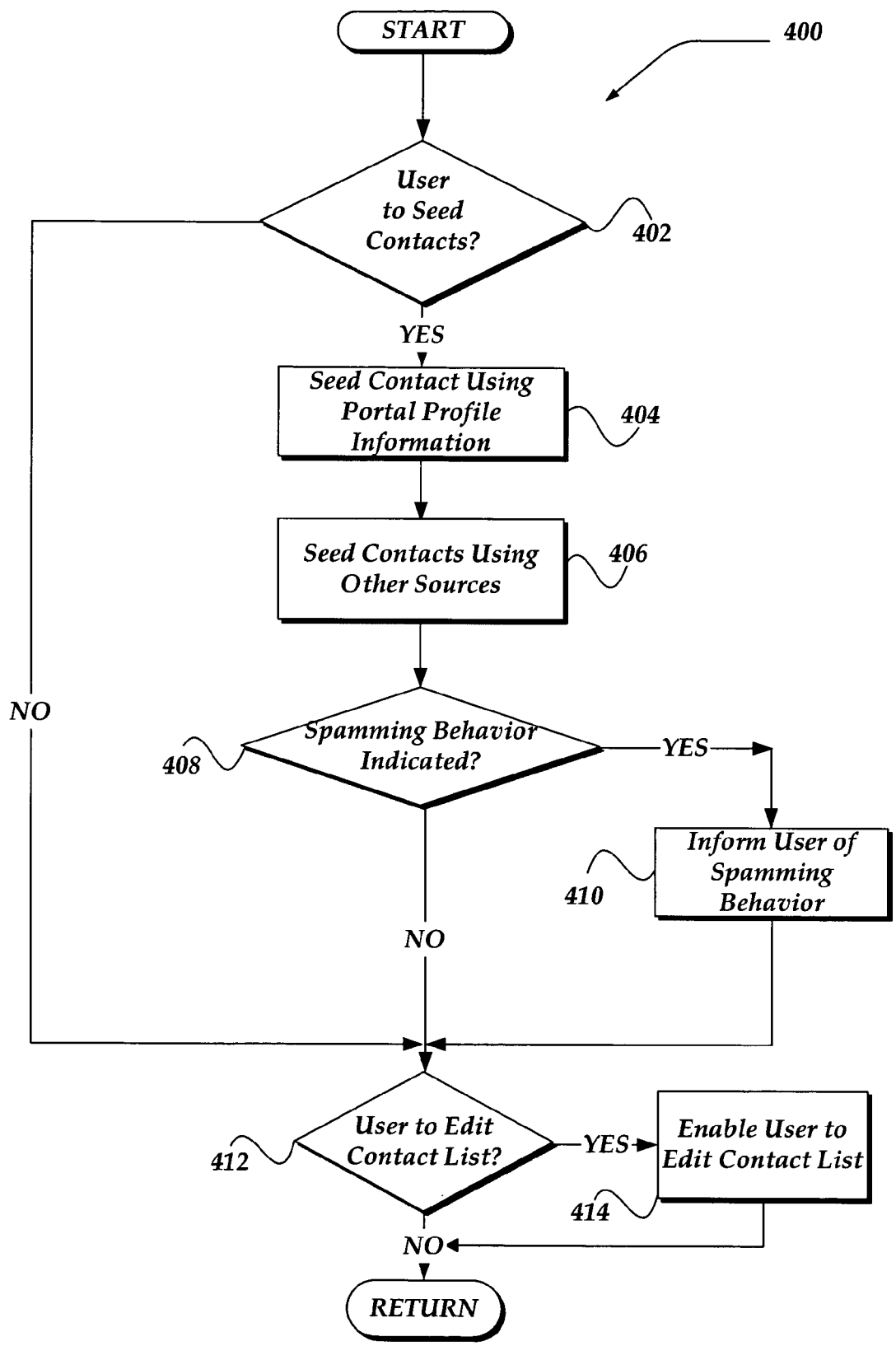
FIG. 4 illustrates a logical flow diagram generally showing one embodiment of a process for seeding an online social network contact list based, in part, on portal information, in accordance with the present invention.

FIG. 4 illustrates a logical flow diagram generally showing one embodiment of a process for seeding an online social network contact list based, in part, on portal information. Process 400 shown in FIG. 4 may be implemented, for example, within SNS 108 of FIG. 1.

Process 400 is typically entered, after a start block, at decision block 402, where a determination is made whether the user has requested seeding of their online social network contact list. In one embodiment, the user need not make the request, as the invention may be configured to determine whether the user's contact list is to be seeded. Such automatic seeding may arise, for example, when the user has recently registered as a portal subscriber and has not yet populated their contact list. Automatic seeding may also arise when it is determined that the contact list is empty, out of date, and the like. In any event, if it is determined that the user's contact list is not to be seeded, processing would then branch to decision block 412.

However, if it is determined, at decision block 402, that the user's contact list is to be seeded, processing continues to block 404. At block 404, the user's online social network contact list is seeded using portal profile information. In one embodiment, the portal profile information employed to seed the user's contact list includes the user's own portal profile information, such as that which may have been tracked and stored during process 300 of FIG. 3. Such seeding of the user's contact list may be complete or partial. That is, it may be determined that some portal profile information does not provide sufficient information about another social user to warrant importation. In another embodiment, portal profile information associated with another user within the current user's portal profile information may be used to seed the present user's contact list. This may arise, for example, where a degree of separation between the other user and the current user is within a predetermined number of degrees. It may also arise, where the current user has predefined a rule, condition, relationship, activity, and the like that may be employed to select a candidate contact for importation.

Upon completion of block 404, processing continues to block 406, where other sources for contacts are employed to seed the user's contact list. Virtually any other source may be employed to seed the user's contact list, including, but not limited to, contacts within an address book of the user, contacts within an address book of another person within the portal, a contact within a buddy list, an instant messaging buddy list, a contact within an activity for which the current user is associated, a contact within a mailing list, an online discussion group, a chat group, and the like. In one embodiment, a master list of contacts is employed, at least in part, to seed the user's contact list. Other contacts may also be derived through the above mechanisms, based on a variety of criteria, including, but not limited, to a degree of separation between contacts within the above, and the like. In any event, upon seeding the current user's contact list with information from other sources, processing proceeds to decision block 408.

At decision operation 408, the online social network service can evaluate the information now in the social network profile to determine whether a contact within the seed contact list engaged in undesirable behavior, such as spamming. The seeded contact list can be analyzed by the online social network service and/or the social network profile can simply include a flag from the portal profile, indicating that the seeded contact engaged in undesirable behavior through the portal. Based on this evaluation, the online social network service and/or members of the social network can take precautionary actions.

For example, if it is determined that a seeded contact has engaged in undesirable behavior, such as spamming, and the like, processing branches to block 410, where, the online social network service, and the like, can inform the user of the seeded contact's previous portal misbehavior(s) and/or current misbehaviors. Processing then flows to decision block 412. If, however, seeded contacts have not engaged in undesired behavior, processing also continues to decision block 412.

At decision block 412, a determination is made whether the current user is to edit the contact list. The user may decide not to modify the contact list for any of a variety of reasons, in which case, processing returns to a calling process to perform other actions. However, if the user is to edit the contact list, processing continues to block 414.

At block 414, the user can add and/or modify information in the user's contact list. For example, the user may intend to retain much of the information imported from the portal profile, which may be based, in part, on an interaction with the online portal, but remove contact information derived from some of those interactions that the user does not wish to employ. For example, where a contact is identified to have engaged in undesirable behavior, the user may wish to delete the contact from their contact list. The user may also enter contacts that have not been identified through the various mechanisms described above. Upon completion of block 414, processing returns to the calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the operations indicated in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustrations support combinations of means for performing the indicated actions, combinations of steps for performing the indicated actions and program instruction means for performing the indicated actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for managing a communication in an online social network, comprising:
   tracking first information related to at least one behavior of a first subscriber of an online portal, wherein the at least one behavior is online between the first subscriber and another subscriber and separate from other behavior between a plurality of members within the online social network, and wherein the first information is determined by the online portal regarding the at least one behavior that is separate from the plurality of members of the online social network;
   tracking second information of a current online action of a second subscriber that is separate from at least other current online actions by the plurality of members within the online social network,
   determining second subscriber profile information based, in part, on the tracked second information of the second subscriber;
   if the second subscriber is a member of the online social network, employing at least a portion of the tracked first information and the tracked second information and at least a portion of the second subscriber's profile information to seed a second subscriber's subscriber-editable online social network contact list with a contact address information regarding the first subscriber for the second subscriber to invite the first subscriber to become a second member of the online social network, wherein the contact list is managed by the second subscriber, wherein the contact address information is associated with the tracked first information related to the at least one behavior of the first subscriber, and wherein the seeding of the contact list is based at least on a determination that the contact list is unpopulated;
   if the first information indicates that the first subscriber is associated with spamming activity, providing the information about spamming activity to the second subscriber to enable the second subscriber to delete the first subscriber from the second subscriber's seeded online social network contact list independent of an action from another subscriber, wherein the indication comprises a flag in the second subscriber's seeded online social network contact list; and employing the seeded online social network contact list to enable the second subscriber to send the communication to the second member of the online social network.

2. The method of claim 1, wherein the online social network includes at least one of multiple degree relationships among members of the online social network, and a shared interest among members of the online social network.

3. The method of claim 1, wherein tracking the information comprises tracking at least one of a frequency with which the first subscriber accessed at least one of a portal service and a non-portal Web site, a duration over which the first subscriber accessed at least one of the portal service and the non-portal Web site, a content type accessed by the first subscriber through at least one of the portal service and the non-portal Web site, an online purchase made by the first subscriber through at least one of the portal service and the non-portal Web site, a participation in an online group, a use of a chat session, a use of instant messaging, and a use of an email service.

4. The method of claim 1, wherein the behavior of the first subscriber comprises participating in at least one of an online friend matching service, an online dating service, an online job searching service, an online classmate searching service, an online military colleague searching service, an online club, an online financial service, an online auction, and a online purchase.

5. The method of claim 1, further comprising:
    determining that the first subscriber has engaged in spamming; and
    indicating in the first information that the first subscriber has engaged in spamming.

6. The method of claim 1, wherein the second subscriber is a new member to the online social network and with a degree of separation from at least the first subscriber tracked in the first information.

7. The method of claim 1, further comprising revising the online social network contact list based, in part, on at least one of an email address, an address book of the second subscriber, another address book of at least one other member within the portal, a buddy list, an instant messaging buddy list, an activity, a mailing list, an online discussion group, a chat group, a master contact list, and user-defined information.

8. A server for managing a communication in an online social network, comprising:
    a transceiver for receiving and sending information to another computing device;
    a processor in communication with the transceiver; and
    a memory in communication with the processor and storing data and machine instructions that cause the processor to perform a plurality of operations, including:
        tracking first information related to at least one behavior of a first subscriber of an online portal, wherein the at least one behavior is online between the first subscriber and another subscriber and separate from other behavior between a plurality of members within the online social network, and wherein the first information is determined by the online portal regarding the at least one behavior that is separate from the plurality of members of the online social network;
        tracking second information of a current online action of a second subscriber that is separate from at least other current online actions by the plurality of members within the online social network;
        determining second subscriber profile information based, in part, on the tracked second information of the second subscriber; and
        if the second subscriber is a member of the online social network, employing at least a portion of the tracked first and second information and at least a portion of the second subscriber's profile information to seed an individual subscriber's online social network contact list with a contact address information regarding the first subscriber for the second subscriber to invite the first subscriber to become a second member of the online social network, wherein the online social network list is managed by the second subscriber, and wherein the second subscriber is enabled to directly delete the contact regarding the first subscriber as the second member within the online social network contact list based in part on receiving information that the contact for the first subscriber has engaged in spamming independent of an action of another subscriber, and wherein information comprises a flag in the online social network contact list received from the online portal, and wherein the second subscriber is enabled to send the communication to the second member of the online social network using the online social network contact list, wherein the contact is associated with the tracked first information related to the behavior of the first subscriber, and wherein the seeding of the contact list is based at least on a determination that the contact list is unpopulated.

9. The server of claim 8, wherein the determined second subscriber profile information does not indicate the second subscriber is associated with the behavior to which the first information relates, and wherein the second subscriber is a new member.

10. The server of claim 8, wherein the machine instructions further cause the processor to perform an operation of tracking at least one of a frequency with which the first or the second subscriber accessed at least one of a portal service and a non-portal Web site, a duration over which the first or the second subscriber accessed at least one of the portal service and the non-portal Web site, a content type accessed by the first or the second subscriber through at least one of the portal service and the non-portal Web site, and an online purchase made by the first or the second subscriber through at least one of the portal service and the non-portal Web site.

11. The server of claim 8, wherein the behavior of the first subscriber comprises participating in at least one of an online friend matching service, an online dating service, an online job searching service, an online classmate searching service, an online military colleague searching service, an online club, an online financial service, an online auction, online purchase a buddy list, an instant messaging service, a mailing list, an online discussion group, a chat service, and an email service.

12. The server of claim 8, wherein the wherein the machine instructions further cause the processor to perform an operation of revising the seeded online social network contact list to further include at least one of a contact within an address book of the first subscriber, a contact within an address book of the other member within the portal, a contact associated with buddy list of the first subscriber, a contact associated with an instant messaging list of the first subscriber, a contact associated with an activity of the first subscriber, a contact associated with a mailing list of the first subscriber, a contact associated with an online discussion group of the first subscriber, and a contact associated with a chat group of the first subscriber.

13. A client device for managing a communication in an online social network, comprising:
    a display;

a transceiver for receiving and sending information to a computing device;
a processor in communication with the display and the transceiver; and
a memory in communication with the processor and storing data and machine instructions that cause the processor to perform a plurality of operations, including:
enabling performance of an at least one behavior of a first subscriber of an online portal employing the client device, wherein the online portal is in communication with the online social network;
enabling a tracking of information related to the at least one behavior of the first subscriber in the online portal that is separate from other behavior between a plurality of members within the online social network;
determining profile information about the first subscriber based in part on a current online action of the first subscriber that is separate from at least other current online actions between the plurality of members within the online social network;
if a second subscriber is a first member of the online social network, receiving an individual subscriber's subscriber-editable online social network contact list that is seeded with a contact address information regarding the first subscriber for the second subscriber to invite the first subscriber to become a second member of the online social network based at least on a portion of the tracked information, the profile information, and additional information associated with behavior in the online portal between another subscriber and venues other than and separate from the online social network of which the second subscriber is the first member, wherein at least the additional information is indicated in a flag associated with the contact address information within the seeded online social network contact list, wherein the contact address information is associated with the additional information, and wherein the seeding of the contact list is based at least on a determination that the contact list is unpopulated;
enabling the second subscriber to select the contact address information within the online social network contact list to delete independent of an action from another subscriber; and
enabling the second subscriber to send the communication to the second member of the online social network based, in part, on the portion of the tracked information, the profile information, and the additional information.

14. The client device of claim 13, wherein the additional information is associated with subscribers that have an indirect personal relationship to the first subscriber.

15. The client device of claim 13, wherein the machine instructions further cause the processor to perform the operation of indicating that at least one contact in the seeded online social network contact list has engaged in spamming.

16. The client device of claim 13, wherein the machine instructions further cause the processor to perform the operation of enabling the first subscriber to create user-definable information to determine another contact with which to seed the online social network contact list.

17. The client device of claim 13, wherein the client device further comprises a mobile device.

18. A computer-readable storage medium having computer-executable instructions for managing a communication in an online social network, the computer-executable instructions enable a computing device to perform actions of:

enabling a tracking of first information related to behavior of a first subscriber of an online portal, wherein the behavior includes another communication in the online portal between the first subscriber and a second subscriber that is separate from other behavior between a plurality of members within the online social network;
tracking second information of a current online action of the second subscriber in the online portal that is separate from at least other current online actions within the plurality of members of the online social network;
determining second subscriber profile information based, in part, on the tracked second information of the second subscriber;
if the second subscriber is a member of the online social network, employing at least a portion of the tracked first information and the tracked second information from the online portal and at least a portion of the second subscriber's profile information from the online portal by the online social network to seed a subscriber-editable online social network contact list with a contact address information regarding the first subscriber for the second subscriber to invite the first subscriber to become a second member of the online social network, wherein the contact list is managed by the second subscriber, wherein contacts on the seeded online social network contact list enable the second subscriber to provide submission to the online portal regarding the behavior of the first subscriber, and wherein the online portal determines the portion of the tracked first information and is enabled to indicate the behavior of the first subscriber with a flag, wherein the contact address information is associated with the tracked first information related to the behavior of the first subscriber, and wherein the seeding of the contact list is based at least on a determination that the contact list is unpopulated; and
enabling the second subscriber to send the communication to the second member of the online social network based, in part, on the portion of the second subscriber's profile information.

19. The computer-readable storage medium of claim 18, the actions further comprising:
if information in the online social network contact list indicates that the contact address information regarding the first subscriber has engaged in spamming, enabling the second subscriber to delete the contact address information from the online social network contact list independent of an action from another subscriber.

20. A method for managing a communication in an online social network, enabled to perform operations comprising:
tracking first information related to behavior of a first subscriber of an online portal that is separate from other behavior between a plurality of members within the online social network, wherein the first information is determined by the online portal and includes at least one other communication in the portal between the first subscriber and a third subscriber other than a second subscriber, wherein the subscribers for which the first information tracks have an indirect relationship to the second subscriber;
tracking second information of a current online action of the second subscriber that is separate from at least other current online actions within the online social network;
determining second subscriber profile information based, in part, on the tracked second information of the second subscriber;
employing at least a portion of the first information and the second information and a portion of the second subscriber profile information to seed a subscriber-editable online social network contact list with a contact address information regarding the first subscriber for the second subscriber to invite to become a second member of the online social network, wherein the online social network contact list is managed by the second subscriber including deleting the contact address information from the list independent of an action by another subscriber, wherein the seeded online social network contact list comprises a flag for the contact address information, and wherein the contact address information is included in the seeded online social network contact list based on the tracked second information, wherein the contact is associated with the tracked first information related to the behavior of the first subscriber, and wherein the seeding of the contact list is based at least on a determination that the contact list is unpopulated; and enabling the second subscriber to send the communication the second member of the online social network based, at least in part, on the portion of the first information.

* * * * *